United States Patent
Hasegawa et al.

(10) Patent No.: US 9,164,330 B2
(45) Date of Patent: Oct. 20, 2015

(54) LIQUID CRYSTAL DISPLAY WITH HORIZONTAL INTER-ELECTRODE DISTANCE AND DIELECTRIC CONSTANT ANISOTROPY OF A LIQUID CRYSTAL LAYER

(71) Applicants: Hitomi Hasegawa, Kumagaya (JP); Jin Hirosawa, Saitama (JP); Yusuke Morita, Fukaya (JP); Hirokazu Morimoto, Fukaya (JP); Arihiro Takeda, Saitama (JP)

(72) Inventors: Hitomi Hasegawa, Kumagaya (JP); Jin Hirosawa, Saitama (JP); Yusuke Morita, Fukaya (JP); Hirokazu Morimoto, Fukaya (JP); Arihiro Takeda, Saitama (JP)

(73) Assignee: Japan Display Inc., Tokyo (JP)

( * ) Notice: Subject to any disclaimer, the term of this patent is extended or adjusted under 35 U.S.C. 154(b) by 248 days.

(21) Appl. No.: 13/785,295

(22) Filed: Mar. 5, 2013

(65) Prior Publication Data

US 2013/0242214 A1    Sep. 19, 2013

(30) Foreign Application Priority Data

Mar. 19, 2012   (JP) .................................. 2012-062387

(51) Int. Cl.
*G02F 1/1343*   (2006.01)
*G02F 1/141*    (2006.01)

(52) U.S. Cl.
CPC .... *G02F 1/134309* (2013.01); *G02F 1/134336* (2013.01); *G02F 2202/42* (2013.01)

(58) Field of Classification Search
CPC .............. G02F 1/134363; G02F 2001/134318; G02F 1/136213

USPC ........................... 349/39, 139–141, 143, 146
See application file for complete search history.

(56) References Cited

U.S. PATENT DOCUMENTS

| | | | |
|---|---|---|---|
| 6,266,116 | B1 | 7/2001 | Ohta et al. |
| 7,408,608 | B2 * | 8/2008 | Lee ................................ 349/141 |
| 2001/0010575 | A1 | 8/2001 | Yoshida et al. |
| 2004/0165136 | A1 | 8/2004 | Sugiyama et al. |
| 2005/0206824 | A1 | 9/2005 | Son et al. |
| 2005/0219453 | A1 | 10/2005 | Kubo et al. |

(Continued)

FOREIGN PATENT DOCUMENTS

| | | |
|---|---|---|
| JP | 6-222397 | 8/1994 |
| JP | 7-159807 | 6/1995 |

(Continued)

OTHER PUBLICATIONS

U.S. Appl. No. 13/749,950, filed Jan. 25, 2013, Morita, et al.

(Continued)

*Primary Examiner* — Huyen Ngo
(74) *Attorney, Agent, or Firm* — Oblon, McClelland, Maier & Neustadt, L.L.P.

(57) ABSTRACT

According to one embodiment, a liquid crystal display includes a first substrate including main pixel electrodes, a second substrate including main common electrodes extending substantially in parallel to the main pixel electrodes and arranged on both sides of each of the main pixel electrodes as seen from above, and a liquid crystal layer including liquid crystal molecules held between the first substrate and the second substrate. A horizontal inter-electrode distance in a first direction between the main pixel electrode and the main common electrode is in a range of 11 μm or more and 13 μm or less, and a dielectric constant anisotropy of the liquid crystal layer is 10 or more and 16 or less.

20 Claims, 4 Drawing Sheets

(56) References Cited

U.S. PATENT DOCUMENTS

| | | | |
|---|---|---|---|
| 2006/0125991 A1* | 6/2006 | Lee | 349/141 |
| 2007/0115234 A1 | 5/2007 | Kim et al. | |
| 2007/0153202 A1* | 7/2007 | Kang | 349/141 |
| 2008/0062358 A1 | 3/2008 | Lee et al. | |
| 2008/0143897 A1* | 6/2008 | Chang | 349/33 |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2009/0225248 A1* | 9/2009 | Kim et al. | 349/42 |
| 2010/0210054 A1* | 8/2010 | Park et al. | 438/30 |

FOREIGN PATENT DOCUMENTS

| | | |
|---|---|---|
| JP | 9-105908 A | 4/1997 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |
| JP | 2007-47786 A | 2/2007 |
| JP | 2009-192822 | 8/2009 |
| JP | 2011-209454 A | 10/2011 |

OTHER PUBLICATIONS

U.S. Appl. No. 13/750,198, filed Jan. 25, 2013, Hasegawa, et al.
U.S. Appl. No. 13/763,88, filed Feb. 11, 2013, Hasegawa, et al.
Japanese Office Action issued Apr. 21, 2015 in Patent Application No. 2012-062387 (with English Translation).

* cited by examiner

LIQUID CRYSTAL DISPLAY WITH HORIZONTAL INTER-ELECTRODE DISTANCE AND DIELECTRIC CONSTANT ANISOTROPY OF A LIQUID CRYSTAL LAYER

CROSS-REFERENCE TO RELATED APPLICATIONS

This application is based upon and claims the benefit of priority from Japanese Patent Application No. 2012-062387, filed Mar. 19, 2012, the entire contents of which are incorporated herein by reference.

FIELD

Embodiments described herein relate generally to the liquid crystal display.

BACKGROUND

In recent years, flat-panel displays have been vigorously developed. By virtue of such advantageous features as light weight, small thickness and low power consumption, special attention has been paid to liquid crystal displays among others. In particular, in active matrix liquid crystal displays in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

DETAILED DESCRIPTION

Figure 1:
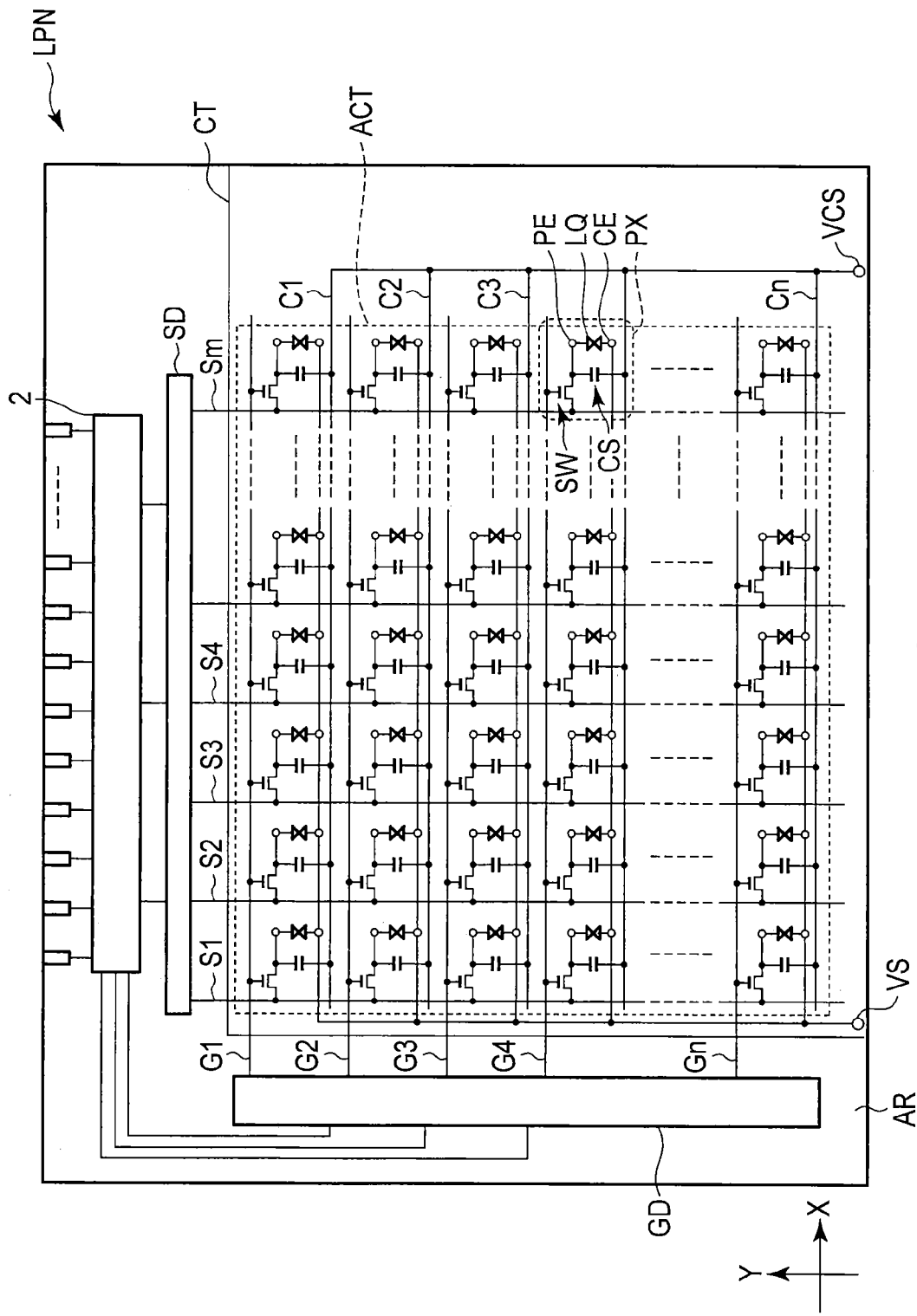
FIG. 1 is a view which schematically illustrates a structure and an equivalent circuit of a liquid crystal display according to an embodiment.

In general, according to one embodiment, a liquid crystal display comprises a first substrate including a main pixel electrode; a second substrate including a main common electrode extending substantially in parallel to the main pixel electrode on both sides of the main pixel electrode; and a liquid crystal layer including liquid crystal molecules held between the first substrate and the second substrate. A horizontal inter-electrode distance in a first direction between the main pixel electrode and the main common electrode is in a range of 11 μm or more and 13 μm or less, and a dielectric constant anisotropy of the liquid crystal layer is 10 or more.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display according to an embodiment.

Specifically, the liquid crystal display includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is disposed between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C extend substantially linearly, for example, in a first direction X. The gate lines G and storage capacitance lines C are alternately arranged in parallel along a second direction Y crossing the first direction X. In this example, the first direction X and the second direction Y are substantially perpendicular to each other. The source lines S cross the gate lines G and storage capacitance lines C. The source lines S extend substantially linearly along the second direction Y. It is not always necessary that each of the gate lines G, storage capacitance lines C and source lines S extend linearly, and a part thereof may be bent.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane which is defined by the first direction X and second direction Y, or to a substrate major surface (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE is disposed common to the pixel electrodes PE of plural pixels PX via the liquid crystal layer LQ. The pixel electrode PE and common electrode CE are formed of a light-transmissive, electrically conductive material such as indium tin oxide (ITO) or indium zinc oxide (IZO), but may be formed of other metallic material such as aluminum.

The array substrate AR includes a power supply module VS for applying a voltage to the common electrode CE. The power supply module VS is formed, for example, on the outside of the active area ACT. The common electrode CE is led out to the outside of the active area ACT, and is electrically connected to the power supply module VS via an electrically conductive member (not shown).

Figure 2:
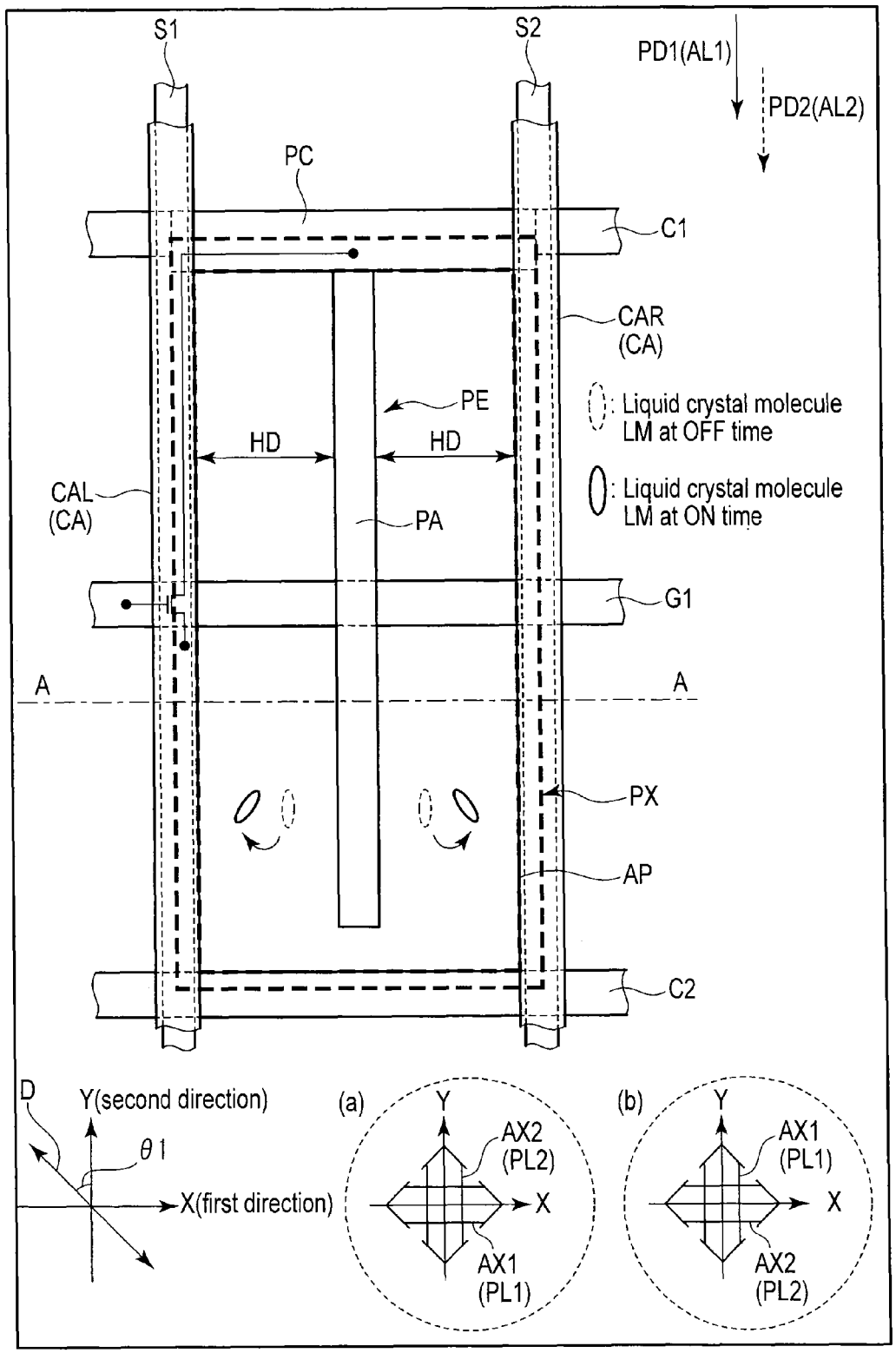
FIG. 2 is a plan view which schematically shows a structure example of a pixel at a time when a liquid crystal display panel shown in FIG. 1 is viewed from a counter-substrate side.

FIG. 2 is a plan view which schematically shows a structure example of one pixel PX at a time when the liquid crystal display panel LPN shown in FIG. 1 is viewed from the counter-substrate side. FIG. 2 is a plan view in an X-Y plane.

The pixel PX shown in FIG. 2 has a rectangular shape having a less length in the first direction X than in the second direction Y, as indicated by a broken line. A storage capacitance line C1 and a storage capacitance line C2 extend in the first direction X. A gate line G1 is disposed between the storage capacitance line C1 and storage capacitance line C2 which neighbor each other, and extends in the first direction X. A source line S1 and a source line S2 extend in the second direction Y. A pixel electrode PE is disposed between the source line S1 and source line S2 which neighbor each other. In addition, the pixel electrode PE is disposed between the storage capacitance line C1 and storage capacitance line C2.

In the example illustrated, in the pixel PX, the source line S1 is disposed at a left side end portion, and the source line S2 is disposed at a right side end portion. Strictly speaking, the source line S1 is disposed to extend over a boundary between the pixel PX and a pixel neighboring on the left side, and the source line S2 is disposed to extend over a boundary between the pixel PX and a pixel neighboring on the right side. In addition, in the pixel PX, the storage capacitance line C1 is disposed at an upper side end portion, and the storage capacitance line C2 is disposed at a lower side end portion. Strictly speaking, the storage capacitance line C1 is disposed to extend over a boundary between the pixel PX and a pixel neighboring on the upper side, and the storage capacitance line C2 is disposed to extend over a boundary between the pixel PX and a pixel neighboring on the lower side. The gate line G1 is disposed at a substantially central part of the pixel.

A switching element SW in the illustrated example is electrically connected to the gate line G1 and source line S1. The switching element SW is provided at an intersection between the gate line G1 and source line S1. A drain line of the switching element SW is made to extend along the source line S1 and storage capacitance line C1, and is electrically connected to the pixel electrode PE via a contact hole (not shown) which is formed at an area overlapping the storage capacitance line C1. The switching element SW is provided at an area overlapping the source line S1 and storage capacitance line C1, and hardly extrudes from the area overlapping the source line S1 and storage capacitance line C1, thus suppressing a decrease in area of an aperture portion which contributes to display.

The pixel electrode PE includes a main pixel electrode PA and a contact portion PC which are electrically connected to each other. The main pixel electrode PA extends linearly in the second direction Y from the contact portion PC to the vicinity of the lower side end portion of the pixel PX. In this embodiment, the width in the first direction X of the main pixel electrode PA is about 5 µm. The main pixel electrode PA is formed in a strip shape having a substantially uniform width in the first direction X. The main pixel electrode PA is disposed at a substantially middle position between the source line S1 and source line S2, that is, at the center of the pixel PX. The distance in the first direction X between the source line S1 and main pixel electrode PA is substantially equal to the distance in the first direction X between the source line S2 and main pixel electrode PA. The contact portion PC is located at an area overlapping the storage capacitance line C1 and is electrically connected to the switching element SW via a contact hole (not shown). The contact portion PC is formed to have a greater width than the main pixel electrode PA.

The common electrode CE includes main common electrodes CA. The main common electrodes CA linearly extend, in the X-Y plane, in the second direction Y substantially in parallel to the main pixel electrode PA, on both sides of the main pixel electrode PA. Alternatively, the main common electrodes CA are opposed to the respective source lines S and extend substantially in parallel to the main pixel electrode PA. In the present embodiment, the width in the first direction X of the main common electrode CA is about 5 µm. The main common electrode CA is formed in a strip shape having a substantially uniform width in the first direction X.

In the example illustrated, two main common electrodes CA are arranged in parallel in the first direction X, and are located at left and right end portions of the pixel PX, respectively. In the description below, in order to distinguish these main common electrodes CA, the main common electrode located on the left side in the Figure is referred to as "CAL", and the main common electrode located on the right side in the Figure is referred to as "CAR". The main common electrode CAL is opposed to the source line S1, and the main common electrode CAR is opposed to the source line S2. The main common electrode CAL and main common electrode CAR are electrically connected to each other within the active area or outside the active area.

In the pixel PX, the main common electrode CAL is disposed at the left side end portion, and the main common electrode CAR is disposed at the right side end portion. Strictly speaking, the main common electrode CAL is disposed to extend over a boundary between the pixel PX and a pixel neighboring on the left side, and the main common electrode CAR is disposed to extend over a boundary between the pixel PX and a pixel neighboring on the right side.

Paying attention to the positional relationship between the main pixel electrode PA and the main common electrodes CA, the main pixel electrode PA and main common electrodes CA are alternately arranged along the first direction X. The main pixel electrode PA and main common electrodes CA are arranged substantially parallel to each other. In this case, in the X-Y plane, neither of the main common electrodes CA overlaps the main pixel electrode PA.

Specifically, one main pixel electrode PA is located between the main common electrode CAL and main common electrode CAR which neighbor each other. In other words, the main common electrode CAL and main common electrode CAR are located on both sides of a position immediately above the main pixel electrode PA. Alternatively, the main pixel electrode PA is located between the main common electrode CAL and main common electrode CAR. Thus, the main common electrode CAL, main pixel electrode PA and main common electrode CAR are arranged in the named order along the first direction X.

The distance in the first direction X between the pixel electrode PE and common electrode CE is substantially uniform. Specifically, the distance in the first direction X between the main common electrode CAL and main pixel electrode PA is substantially equal to the distance in the first direction X between the main common electrode CAR and main pixel electrode PA.

In the embodiment, the distance in the first direction X between the main common electrode CA and main pixel electrode PA, that is, the distance in the first direction X between mutually opposed edges of the main pixel electrode PA and main common electrode CA in the X-Y plane, is referred to as a horizontal inter-electrode distance HD. In the liquid crystal display of this embodiment, the horizontal inter-electrode distance HD is about 13 μm. If the horizontal inter-electrode distance HD is decreased, the voltage for controlling the alignment state of a liquid crystal can be made relatively low, and low power consumption is realized. Meanwhile, in some cases, since the aperture area in each pixel decreases, the brightness lowers. On the other hand, if the horizontal inter-electrode distance HD is increased, the aperture area in each pixel can be enlarged. However, a high voltage needs to be applied in order to control the alignment state of the liquid crystal, and it is difficult to reduce power consumption. Thus, it is desirable to increase the horizontal inter-electrode distance HD as much as possible, so that the power consumption falls within a predetermined range. In the present embodiment, by adopting liquid crystal materials which will be described later, the horizontal inter-electrode distance HD can be set in a range of 11 μm or more and 13 μm or less.

Figure 3:
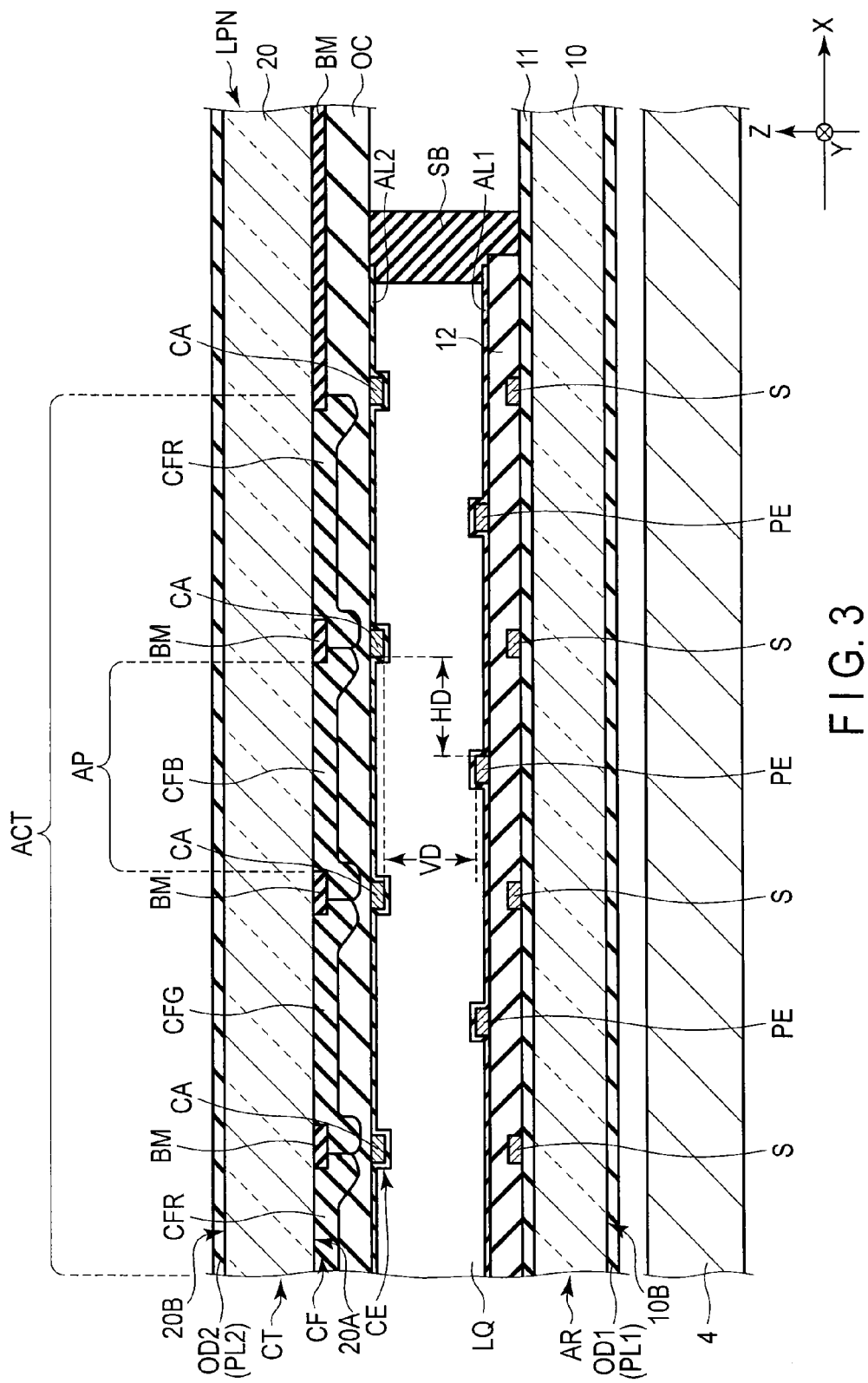
FIG. 3 is a schematic cross-sectional view, taken along line A-A in FIG. 2, showing a cross-sectional structure of the liquid crystal display panel shown in FIG. 2.

FIG. 3 is a schematic cross-sectional view, taken along line A-A in FIG. 2, showing a cross-sectional structure of the liquid crystal display panel LPN shown in FIG. 2. FIG. 3 shows only parts which are necessary for the description.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

The array substrate AR is formed by using a first insulative substrate 10 having light transmissivity. Source lines S are formed on a first interlayer insulation film 11, and are covered with a second interlayer insulation film 12. Gate lines (not shown) and storage capacitance lines (not shown) are disposed, for example, between the first insulative substrate 10 and first interlayer insulation film 11. Pixel electrodes PE are formed on the second interlayer insulation film 12. The pixel electrode PE is located inside the positions immediately above the neighboring source lines S.

A first alignment film AL1 is disposed on that surface of the array substrate AR, which is opposed to the counter-substrate CT, and the first alignment film AL1 extends over substantially the entirety of the active area ACT. The first alignment film AL1 covers the pixel electrodes PE, etc., and is also disposed over the second interlayer insulation film 12. The first alignment film AL1 is formed of a material which exhibits horizontal alignment properties.

In the meantime, the array substrate AR may also include a part of the common electrode CE.

The counter-substrate CT is formed by using a second insulative substrate 20 having light transmissivity. The counter-substrate CT includes a black matrix BM, a color filter CF, an overcoat layer OC, a common electrode CE, and a second alignment film AL2.

The black matrix BM partitions each pixel PX, and forms an aperture portion AP which is opposed to the pixel electrode PE. Specifically, the black matrix BM is disposed so as to be opposed to wiring portions, such as the source lines S, gate lines, storage capacitance lines, and switching elements. In this example, only those portions of the black matrix BM, which extend in the second direction Y, are depicted, but the black matrix BM may also include portions which extend in the first direction X. The black matrix BM is disposed on an inner surface 20A of the second insulative substrate 20, which is opposed to the array substrate AR.

The color filter CF is disposed in association with each pixel PX. Specifically, the color filter CF is disposed in the aperture portion AP on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter CFR, which is formed of a resin material that is colored in red, is disposed in association with a red pixel. A blue color filter CFB, which is formed of a resin material that is colored in blue, is disposed in association with a blue pixel. A green color filter CFG, which is formed of a resin material that is colored in green, is disposed in association with a green pixel. Boundaries between these color filters CF are located at positions overlapping the black matrix BM.

The overcoat layer OC covers the color filters CF. The overcoat layer OC reduces the effect of asperities on the surface of the color filters CF.

The common electrode CE is formed on that side of the overcoat layer OC, which is opposed to the array substrate AR. The distance in a third direction Z between the common electrode CE and pixel electrode PE is substantially uniform. The third direction Z is a direction perpendicular to the first direction X and second direction Y, or a normal direction of the liquid crystal display panel LPN. In the present embodiment, the distance in the third direction Z between the common electrode CE and pixel electrode PE, that is, the distance in the third direction Z between the mutually opposed surfaces of the pixel electrode PE and common electrode CE, is referred to as a vertical inter-electrode distance VD. In the liquid crystal display of the present embodiment, the vertical inter-electrode distance VD is about 3 μm.

The second alignment film AL2 is disposed on that surface of the counter-substrate CT, which is opposed to the array substrate AR, and the second alignment film AL2 extends over substantially the entirety of the active area ACT. The second alignment film AL2 covers the common electrode CE and overcoat layer OC. The second alignment film AL2 is formed of a material which exhibits horizontal alignment properties.

The first alignment film AL1 and second alignment film AL2 are subjected to alignment treatment (e.g. rubbing treatment or optical alignment treatment) for initially aligning the liquid crystal molecules of the liquid crystal layer LQ. A first alignment treatment direction PD1, in which the first alignment film AL1 initially aligns the liquid crystal molecules, and a second alignment treatment direction PD2, in which the second alignment film AL2 initially aligns the liquid crystal molecules, are parallel to each other, and are opposite to or identical to each other. For example, as shown in FIG. 2, the first alignment treatment direction PD1 and second alignment treatment direction PD2 are substantially parallel to the second direction Y, and are identical.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 μm, is created. The array substrate AR and counter-substrate CT are attached by a sealant SB on the outside of the active area ACT in the state in which the predetermined cell gap is created therebetween. In the meantime, the cell gap in this case is substantially equal to the above-described vertical inter-electrode distance VD.

A first optical element OD1 is attached by, e.g. an adhesive, to an outer surface of the array substrate AR, that is, an outer surface 10B of the first insulative substrate 10 which constitutes the array substrate AR. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis (or first absorption axis) AX1.

A second optical element OD2 is attached by, e.g. an adhesive, to an outer surface of the counter-substrate CT, that is, an outer surface 20B of the second insulative substrate 20 which constitutes the counter-substrate CT. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis (or second absorption axis) AX2.

The first polarization axis AX1 of the first polarizer PL1 and the second polarization axis AX2 of the second polarizer PL2 have an orthogonal positional relationship (crossed Nicols). In this case, one of the polarizers is disposed, for example, such that the polarization axis thereof is parallel or perpendicular to the initial alignment direction of liquid crystal molecules, that is, the first alignment treatment direction PD1 or second alignment treatment direction PD2. When the initial alignment direction is parallel to the second direction Y, the polarization axis of one of the polarizers is parallel to the second direction Y or parallel to the first direction X.

In an example shown in part (a) of FIG. 2, the first polarizer PL1 is disposed such that the first polarization axis AX1 thereof is perpendicular to the initial alignment direction (second direction Y) of liquid crystal molecules LM (i.e. parallel to the first direction X), and the second polarizer PL2 is disposed such that the second polarization axis AX2 thereof is parallel to the initial alignment direction of liquid crystal molecules (i.e. parallel to the second direction Y).

In an example shown in part (b) of FIG. 2, the second polarizer PL2 is disposed such that the second polarization axis AX2 thereof is perpendicular to the initial alignment direction (second direction Y) of liquid crystal molecules LM (i.e. parallel to the first direction X), and the first polarizer PL1 is disposed such that the first polarization axis AX1 thereof is parallel to the initial alignment direction of liquid crystal molecules (i.e. parallel to the second direction Y).

The liquid crystal layer LQ is held in the cell gap which is created between the array substrate AR and the counter-substrate CT, and is disposed between the first alignment film AL1 and second alignment film AL2. The liquid crystal layer LQ is composed of, for example, a liquid crystal material having a positive (positive-type) dielectric constant anisotropy.

In the above-described liquid crystal display, by the arrangement of the two polarizers PL1 and PL2, a black screen is displayed when no voltage is applied. In addition, by supplying a video signal to the pixel electrode PE via the switching element SW from the source line S, a horizontal electric field, which is substantially parallel to the substrate, is produced by a potential difference between the pixel electrode PE and the common electrode CE. Liquid crystal molecules rotate in a plane which is substantially parallel to the substrate major surface, so that the liquid crystal molecules may be aligned in the direction of the horizontal electric field.

Next, the operation of the liquid crystal display panel LPN having the above-described structure is described with reference to FIG. 2 and FIG. 3.

Specifically, in a state in which no voltage is applied to the liquid crystal layer LQ, that is, in a state (OFF time) in which no potential difference (or electric field) is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane.

In this case, each of the first alignment treatment direction PD1 and the second alignment treatment direction PD2 is substantially parallel to the second direction Y. At the OFF time, the liquid crystal molecule LM is initially aligned such that the major axis thereof is substantially parallel to the second direction Y, as indicated by a broken line in FIG. 2. Specifically, the initial alignment direction of the liquid crystal molecule LM is parallel to the second direction Y (or 0° to the second direction Y).

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM are aligned with such pre-tilt angles that the liquid crystal molecules LM become symmetric in the vicinity of the first alignment film AL1 and in the vicinity of the second alignment film AL2, with respect to the middle part as the boundary (splay alignment).

As the result of the alignment treatment of the first alignment film AL1 in the first alignment treatment direction PD1, the liquid crystal molecules LM in the vicinity of the first alignment film AL1 are initially aligned in the first alignment treatment direction PD1. As the result of the alignment treatment of the second alignment film AL2 in the second alignment treatment direction PD2, the liquid crystal molecules LM in the vicinity of the second alignment film AL2 are initially aligned in the second alignment treatment direction PD2. When the first alignment treatment direction PD1 and the second alignment treatment direction PD2 are parallel and identical to each other, the liquid crystal molecules LM are splay-aligned, as described above, and the alignment of the liquid crystal molecules LM in the vicinity of the first alignment film AL1 on the array substrate AR and the alignment of the liquid crystal molecules LM in the vicinity of the second alignment film AL2 on the counter-substrate CT become symmetric in the up-and-down direction with respect to the middle part of the liquid crystal layer LQ as the boundary. Thus, optical compensation can be made even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved.

In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1 and enters the liquid crystal display panel LPN. The polarization state of the light, which enters the liquid crystal display panel LPN, varies depending on the alignment state of the liquid crystal molecules LM at a time when the light passes through the liquid crystal layer LQ. At the OFF time, the light, which has passed through the liquid crystal layer LQ, is absorbed by the second polarizer PL2 (black display).

On the other hand, in a state in which a voltage is applied to the liquid crystal layer LQ, that is, in a state (ON time) in which a potential difference (or electric field) is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is parallel to the X-Y plane, as indicated by solid lines in the Figure.

In the example shown in FIG. 2, the liquid crystal molecule LM in a region between the pixel electrode PE and main common electrode CAL rotates clockwise relative to the second direction Y, and is aligned in a lower left direction in the Figure. The liquid crystal molecule LM in a region between the pixel electrode PE and main common electrode CAR rotates counterclockwise relative to the second direction Y, and is aligned in a lower right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the pixel electrode PE, and domains are formed in the respective alignment directions. Specifically, a plurality of domains are formed in one pixel PX.

At such ON time, part of backlight, which is incident on the liquid crystal display panel LPN from the backlight 4, passes through the first polarizer PL1, and enters the liquid crystal display panel LPN. The light entering the liquid crystal layer LQ varies the polarization state thereof. At the ON time, at least part of the light emerging from the liquid crystal layer LQ passes through the second polarizer PL2 (white display).

In the OFF state, the liquid crystal molecule LM is initially aligned in a direction which is substantially parallel to the second direction Y. In the ON state in which a potential difference is produced between the pixel electrode PE and common electrode CE, when the director of the liquid crystal molecule LM (or the major axis direction of the liquid crystal molecule LM) is displaced by about 45° relative to the first polarization axis AX1 of the first polarizer PL1 and the second polarization axis AX2 of the second polarizer PL2 in the X-Y plane, an optical modulation ratio of the liquid crystal becomes highest (i.e. the transmittance at the aperture portion becomes maximum).

In the example illustrated, in the ON state, the director of the liquid crystal molecule LM between the main common electrode CAL and pixel electrode PE is substantially parallel to a 45° to 225° azimuth direction in the X-Y plane, the director of the liquid crystal molecule LM between the main common electrode CAR and pixel electrode PE is substantially parallel to a 135° to 315° azimuth direction in the X-Y plane, and a peak transmittance is obtained. At this time, if attention is paid to a transmittance distribution per pixel, the transmittance is substantially zero on the pixel electrode PE and common electrode CE, and a high transmittance is obtained over substantially the entirety of the inter-electrode gap between the pixel electrode PE and common electrode CE.

In the meantime, the main common electrode CAL, which is located immediately above the source line S1, and the main common electrode CAR, which is located immediately above the source line S2, are opposed to the black matrices BM. Each of the main common electrode CAL and main common electrode CAR has a width which is equal to or less than the width in the first direction X of the black matrix BM, and does not extend to the pixel electrode PE side from the position overlapping the black matrix BM. Thus, in each pixel, the aperture portion which contributes to display corresponds to areas between the pixel electrode PE, on the one hand, and the main common electrode CAL and main common electrode CAR, on the other hand, of the area between the black matrices BM or the area between the source line S1 and source line S2.

According to the present embodiment, therefore, a decrease in transmittance can be suppressed. Thereby, degradation in display quality can be suppressed.

In the liquid crystal display of this embodiment, there was a case in which the electric field could not effectively be used depending on conditions such as a dielectric constant anisotropy $\Delta\epsilon$ of a liquid crystal material and a horizontal inter-electrode distance HD, and the transmittance lowered. For example, when the same liquid crystal material as in a liquid crystal display of an IPS mode or an FFS mode, which makes use of a lateral electric field, was used in the above-described liquid crystal display, a sufficiently brightness could not be obtained.

Taking the above into account, the inventors found the conditions of liquid crystal materials, which are necessary for obtaining a sufficient brightness in the above-described liquid crystal display. Using a comparative example, a description will be given below of liquid crystal materials which are applied to the liquid crystal display of the present embodiment.

Figure 4:
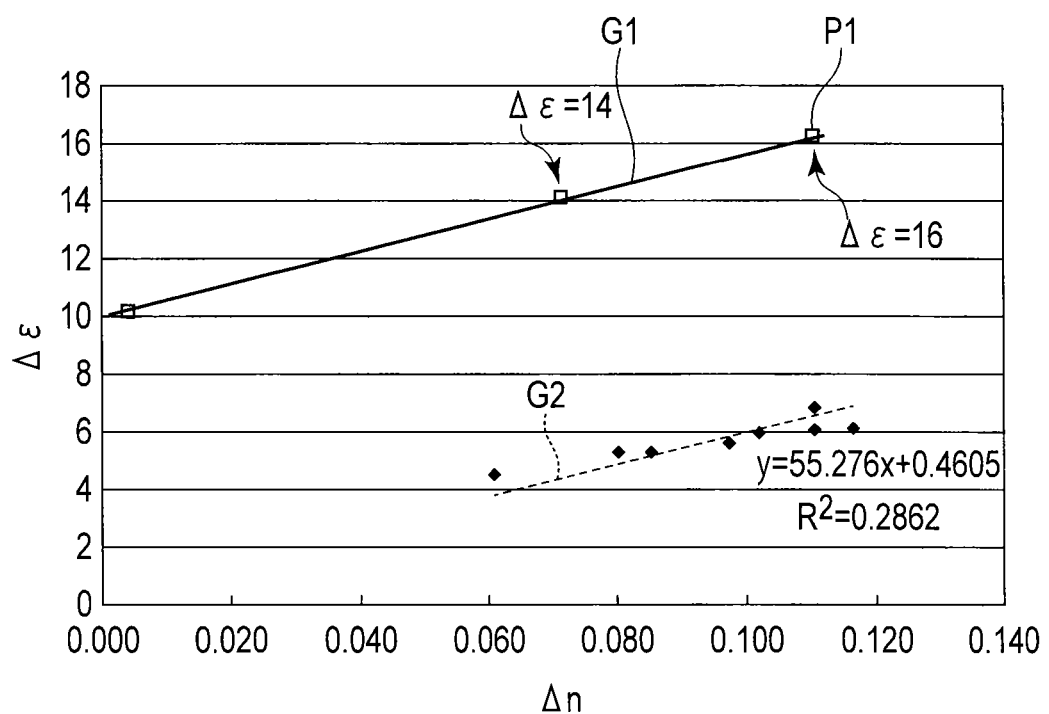
FIG. 4 shows an example of the relationship between a refractive index anisotropy and a dielectric constant anisotropy, with respect to liquid crystal materials which are applied to the liquid crystal display of the embodiment and a liquid crystal display of a comparative example.

FIG. 4 shows an example of the relationship between a refractive index anisotropy Δn and a dielectric constant anisotropy Δϵ, with respect to liquid crystal materials which are applied to the liquid crystal display of the embodiment and liquid crystal materials which are applied to a liquid crystal display of a comparative example.

FIG. 4 shows a scatter diagram in which a plurality of liquid crystal materials are plotted, with the abscissa indicating the refractive index anisotropy Δn and the ordinate indicating the dielectric constant anisotropy Δϵ, and graphs G1 and G2 of approximate expressions. Diamond-shaped plots indicate liquid crystal materials which were applied to an IPS mode or FFS mode liquid crystal display of the comparative example, and each diamond-shaped plot indicates a liquid crystal material in the case where a sufficient brightness was obtained. A square-shaped plot P1 indicates a liquid crystal material with which a sufficient brightness was obtained when this liquid crystal material was applied to the liquid crystal display of the embodiment. The liquid crystal material of the plot P1 has a dielectric constant anisotropy Δϵ of 16, and a refractive index anisotropy Δn of about 0.1.

In the liquid crystal display of the comparative example, both the pixel electrode PE and common electrode CE are disposed on the array substrate AR and the alignment state of the liquid crystal is controlled by making use of a lateral electric field which is produced between the pixel electrode PE and common electrode CE (e.g. a liquid crystal display of an FFS mode or an IPS mode). In the liquid crystal display of the comparative example, the inter-electrode distance (horizontal inter-electrode distance) in the first direction X between the pixel electrode PE and common electrode CE is in a range of 3 μm or more and 4 μm or less.

Besides, in each of the liquid crystal display of the embodiment and the liquid crystal display of the comparative example, the gap (vertical inter-electrode distance) between the array substrate AR and counter-substrate CT is about 3 μm, and the voltage applied to the liquid crystal layer LQ at the time of white display is about 5 V.

The approximate graph G1 shown in FIG. 4 is a graph extending through the plots of the liquid crystal materials of the liquid crystal display of the embodiment and has the same inclination as the approximate graph G2. Incidentally, the approximate expression of the plots of liquid crystal materials of the liquid crystal display of the comparative example was calculated, for example, by a least square method.

When the liquid crystal material (dielectric constant anisotropy Δϵ=16) of the plot P1 was applied to the liquid crystal display of the embodiment, a brightness, which is 90% to 95% of the brightness (transmittance) of the liquid crystal display of the comparative example, was obtained.

In addition, by simulation, when a liquid crystal material having a dielectric constant anisotropy Δϵ of 14 and a refractive index anisotropy Δn of about 0.1 was applied to the liquid crystal display of the embodiment, a brightness, which is 80% or more of the brightness of the liquid crystal display of the comparative example, was obtained.

When a liquid crystal material having a dielectric constant anisotropy Δϵ of 10 and a refractive index anisotropy Δn of about 0.1 was applied to the liquid crystal display of the embodiment, a brightness, which is 70% or more of the brightness of the liquid crystal display of the comparative example, was obtained. In the case of the brightness which is 70% or more of the brightness of the liquid crystal display of the comparative example, a brightness which is equal to the brightness of the liquid crystal display of the comparative example was successfully obtained without lowering display quality, by increasing the liquid crystal driving voltage at the time of white display or by increasing the luminance of the backlight.

From the above-described results, in the liquid crystal display of the present embodiment, the liquid crystal material should preferably have the dielectric constant anisotropy Δϵ of 10 or more, and should more preferably have the dielectric constant anisotropy Δϵ of 14 or more. Furthermore, if the dielectric constant anisotropy Δϵ of the liquid crystal material is set at about 16, a liquid crystal display having a sufficient brightness can be obtained without increasing the liquid crystal driving voltage at the time of white display or increasing the luminance of the backlight.

Besides, according to the embodiment, a high transmittance is obtained in the inter-electrode gap between the pixel electrode PE and common electrode CE. Thus, a sufficiently high transmittance per pixel can be obtained by increasing the inter-electrode distance between the pixel electrode PE, on the one hand, and the main common electrode CAL and main common electrode CAR, on the other hand. In the present embodiment, the liquid crystal display with a sufficient brightness was successfully obtained by using the above-described liquid crystal materials, by setting the horizontal inter-electrode distance HD in a range of 11 μm or more and 13 μm or less. In the meantime, the horizontal inter-electrode distance HD is greater than the vertical inter-electrode distance VD, or in other words, the horizontal inter-electrode distance HD is greater than the thickness of the liquid crystal layer.

In addition, if the liquid crystal driving voltage at the time of white display is increased or the luminance of the backlight is increased, power consumption would increase. However, by selecting a proper liquid crystal material, it is possible to avoid an increase in power consumption.

Specifically, according to the present embodiment, it is possible to provide a liquid crystal display which can suppress, with use of a proper liquid crystal material, a decrease in brightness, and can suppress degradation in display quality.

As regards product specifications in which the pixel pitch is different, the peak condition of the transmittance distribution can be used by varying the inter-electrode distance (i.e. by varying the position of disposition of the main common electrodes CA relative to the pixel electrode PE that is disposed at substantially the center of the pixel PX). Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch. Therefore, requirements for high transmittance and high resolution can easily be realized.

According to the present embodiment, if attention is paid to the transmittance distribution in the region overlapping the black matrix BM, the transmittance is sufficiently lowered in this region. The reason for this is that the electric field does not leak to the outside of the pixel from the position of the common electrode CE, and an undesired lateral electric field does not occur between pixels which neighbor each other with the black matrix BM interposed, and therefore the liquid crystal molecules in the region overlapping the black matrix BM keep the initial alignment state, like the case of the OFF time (or black display time). Accordingly, even when the colors of the color filters are different between neighboring pixels, the occurrence of color mixture can be suppressed, and the decrease in color reproducibility or the decrease in contrast ratio can be suppressed.

When misalignment occurs between the array substrate AR and the counter-substrate CT, there are cases in which a difference occurs in the horizontal inter-electrode distance HD between the pixel electrode PE and the common electrodes CE on both sides of the pixel electrode PE. However, since such misalignment commonly occurs in all pixels PX, the electric field distribution does not differ between the pixels PX, and the influence on the display of images is very small. In addition, even when misalignment occurs between the array substrate AR and the counter-substrate CT, leakage of an undesired electric field to the neighboring pixel can be suppressed. Thus, even when the colors of the color filters differ between neighboring pixels, the occurrence of color mixture can be suppressed, and the decrease in color reproducibility or the decrease in contrast ratio can be suppressed.

According to the present embodiment, the main common electrodes CA are opposed to the source lines S. In particular, in the case where the main common electrode CAL and main common electrode CAR are disposed immediately above the source line S1 and source line S2, compared to the case where the main common electrode CAL and main common electrode CAR are disposed on the pixel electrode PE side of the source line S1 and source line S2, the aperture portion AP can be enlarged and the transmittance of the pixel PX can be enhanced.

In addition, by disposing the main common electrode CAL and main common electrode CAR immediately above the source line S1 and source line S2, the inter-electrode distance between the pixel electrode PE, on the one hand, and the main common electrode CAL and main common electrode CAR, on the other hand, can be increased, and a lateral electric field, which is closer to a horizontal lateral electric field, can be produced. Therefore, a wide viewing angle, which is the advantage of an IPS mode, etc. in the conventional structure, can be maintained.

According to the present embodiment, a plurality of domains can be formed in one pixel. Thus, the viewing angle can optically be compensated in plural directions, and a wide viewing angle can be realized.

The above-described example is directed to the case where the initial alignment direction of liquid crystal molecules LM is parallel to the second direction Y. However, the initial alignment direction of liquid crystal molecules LM may be an oblique direction D which obliquely crosses the second direction Y, as shown in FIG. 2. An angle $\theta 1$ formed between the second direction Y and the initial alignment direction D is 0° or more and 45° or less. From the standpoint of alignment control of liquid crystal molecules LM, it is very effective that the angle $\theta 1$ is about 5° to 30°, more preferably 20° or less. Specifically, it is desirable that the initial alignment direction of liquid crystal molecules LM be substantially parallel to a direction in a range of 0° to 20°, relative to the second direction Y.

The above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy. Although a detailed description is omitted, in the case of the negative-type liquid crystal material, since the positive/negative state of dielectric constant anisotropy is reversed, it is desirable that the above-described formed angle $\theta 1$ be within the range of 45° to 90°, preferably the range of 70° or more.

Since a lateral electric field is hardly produced over the pixel electrode PE or common electrode CE even at the ON time (or an electric field enough to drive liquid crystal molecules LM is not produced), the liquid crystal molecules LM scarcely move from the initial alignment direction, like the case of the OFF time. Thus, even if the pixel electrode PE and common electrode CE are formed of a light-transmissive, electrically conductive material such as ITO, little backlight passes through these regions, and these regions hardly contribute to display at the ON time. Thus, the pixel electrode PE and common electrode CE in this embodiment do not necessarily need to be formed of a transparent, electrically conductive material, and may be formed of an electrically conductive material such as aluminum, silver, or copper.

In the present embodiment, the structure of the pixel PX is not limited to the example shown in FIG. 2. For example, a plurality of main pixel electrodes PA may be disposed in one pixel PX, and a plurality of main common electrodes CA may be disposed on both sides of each of the main pixel electrodes. In this case, too, the same advantageous effects as in the above-described embodiment can be obtained by setting the horizontal inter-electrode distance HD in a range of 11 μm or more and 13 μm or less and by selecting a proper liquid crystal material.

In the present embodiment, the common electrode CE may include, in addition to the main common electrodes CA provided on the counter-substrate CT, second main common electrodes which are provided on the array substrate AR, are opposed to the main common electrodes CA (or opposed to the source lines S) and are electrically isolated from the pixel electrode PE. The second main common electrodes extend substantially in parallel to the main common electrodes CA and have the same potential as the main common electrodes CA. By providing such second main common electrodes, an undesired electric field from the source lines S can be shielded.

In addition, the common electrode CE may include, in addition to the main common electrodes CA provided on the counter-substrate CT, second sub-common electrodes which are provided on the array substrate AR and are opposed to the gate line G and storage capacitance lines C. The second sub-common electrodes extend in a direction crossing the main common electrodes CA and have the same potential as the main common electrodes CA. By providing such second sub-common electrodes, an undesired electric field from the gate line G and storage capacitance lines C can be shielded. According to the structure including such second main common electrodes and second sub-common electrodes, degradation in display quality can further be suppressed.

As has been described above, according to the present embodiment, it is possible to provide a liquid crystal display which can suppress degradation in display quality.

In the meantime, in the above-described embodiment, the liquid crystal display with good display quality is provided by properly setting the inter-electrode distance in the first direction X and the dielectric constant anisotropy of the liquid crystal material. The reason why the vertical inter-electrode distance VD is not specified is that if the vertical inter-electrode distance VD varies, the distance between the main pixel electrode PA and main common electrode CA also varies and affects the display quality, but the effect of the variation of the vertical inter-electrode distance VD is less than the effect of the variation of the horizontal inter-electrode distance HD. Incidentally, the vertical inter-electrode distance VD should preferably be in a range of 2 µm or more and 4 µm or less. In this case, it is possible to provide a liquid crystal display with good display quality and reduced power consumption.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display comprising:
a first substrate including main pixel electrodes;
a second substrate including main common electrodes extending substantially in parallel to the main pixel electrodes, one of the main common electrodes being arranged on each side of a respective one of the main pixel electrodes as seen from a viewing side of the second substrate; and
a liquid crystal layer including liquid crystal molecules held between the first substrate and the second substrate,
wherein a horizontal inter-electrode distance in a horizontal direction between the respective one of the main pixel electrodes and the one of the main common electrode electrodes is in a range of 11 µm or more and 13 µm or less, and a dielectric constant anisotropy of the liquid crystal layer is 10 or more and 16 or less.

2. The liquid crystal display of claim 1, wherein the dielectric constant anisotropy of the liquid crystal layer is 14 or more and 16 or less.

3. The liquid crystal display of claim 2, wherein a vertical inter-electrode distance between the respective one of the main pixel electrodes and the one of the main common electrodes is about 3 µm.

4. The liquid crystal display of claim 3, wherein a maximum voltage, which is applied to the liquid crystal layer, is 5 V.

5. The liquid crystal display of claim 2, wherein a maximum voltage, which is applied to the liquid crystal layer, is 5 V.

6. The liquid crystal display of claim 1, wherein the dielectric constant anisotropy of the liquid crystal layer is 16.

7. The liquid crystal display of claim 6, wherein a vertical inter-electrode distance between the respective one of the main pixel electrodes and the one of the main common electrodes is about 3 µm.

8. The liquid crystal display of claim 7, wherein a maximum voltage, which is applied to the liquid crystal layer, is 5 V.

9. The liquid crystal display of claim 6, wherein a maximum voltage, which is applied to the liquid crystal layer, is 5 V.

10. The liquid crystal display of claim 1, wherein a vertical inter-electrode distance between the respective one of the main pixel electrodes and the one of the main common electrodes is about 3 µm.

11. The liquid crystal display of claim 4, wherein a maximum voltage, which is applied to the liquid crystal layer, is 5 V.

12. The liquid crystal display of claim 1, wherein a maximum voltage, which is applied to the liquid crystal layer, is 5 V.

13. A liquid crystal display comprising:
a first substrate including source lines extending in a second direction, gate lines extending in a first direction, which is substantially perpendicular to the second direction, storage capacitance lines extending in the first direction, main pixel electrodes, each of the main pixel electrodes extending in the second direction between the source lines, contact portions, each of the contact portions being electrically connected to each of the main pixel electrodes and disposed in an upper layer of the storage capacitance line, and switching elements, the switching elements being configured to switch a connection between the source lines and the main pixel electrodes by a signal which is applied to the gate lines;
a second substrate including main common electrodes extending substantially in parallel to the main pixel electrodes, one of the main common electrodes being arranged on each side of a respective one of the main pixel electrodes as seen from a viewing side of the second substrate; and
a liquid crystal layer including liquid crystal molecules held between the first substrate and the second substrate,
wherein when a horizontal inter-electrode distance in the first direction between the respective one of the main pixel electrodes and the one of the main common electrodes is in a range of 11 µm or more and 13 µm or less, a dielectric constant anisotropy of the liquid crystal layer is 10 or more and 16 or less.

14. A liquid crystal display comprising:
a first substrate including source lines, gate lines crossing the source lines, main pixel electrodes, each of the main pixel electrodes extending along the source lines between the source lines, and switching elements, the switching elements being configured to switch a connection between the source lines and the main pixel electrodes by a signal which is applied to the gate lines;
a second substrate including main common electrodes extending substantially in parallel to the main pixel electrodes, one of the main common electrodes being arranged on each side of a respective one of the main pixel electrodes as seen from a viewing side of the second substrate; and
a liquid crystal layer including liquid crystal molecules held between the first substrate and the second substrate,
wherein a horizontal inter-electrode distance between the respective one of the main pixel electrodes and one of the main common electrodes is greater than a thickness of the liquid crystal layer, and a dielectric constant anisotropy of the liquid crystal layer is 10 or more and 16 or less.

15. The liquid crystal display of claim 14, wherein the horizontal inter-electrode distance is in a range of 11 µm or more and 13 µm or less.

16. The liquid crystal display of claim 15, wherein the thickness of the liquid crystal layer is in a range of 2 µm or more and 4 µm or less.

17. The liquid crystal display of claim 16, wherein the dielectric constant anisotropy of the liquid crystal layer is 14 or more and 16 or less.

18. The liquid crystal display of claim 17, wherein the dielectric constant anisotropy of the liquid crystal layer is 16.

19. The liquid crystal display of claim 17, wherein a vertical inter-electrode distance between the main pixel electrode and the main common electrode is about 3 µm.

20. The liquid crystal display of claim 17, wherein a maximum voltage, which is applied to the liquid crystal layer, is 5 V.

* * * * *